(12) United States Patent
Omeis et al.

(10) Patent No.: US 7,847,031 B2
(45) Date of Patent: Dec. 7, 2010

(54) CONTINUOUS PROCESS FOR THE PREPARATION OF A REACTIVE POLYMER

(75) Inventors: Marianne Omeis, Dorsten (DE); Jürgen Szumigala, Herten (DE); Jochen Stegemann, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 214 days.

(21) Appl. No.: 12/037,465

(22) Filed: Feb. 26, 2008

(65) Prior Publication Data

US 2008/0207838 A1 Aug. 28, 2008

(30) Foreign Application Priority Data

Feb. 27, 2007 (DE) .................. 10 2007 009 921

(51) Int. Cl.
*C08F 8/32* (2006.01)
(52) U.S. Cl. .................. 525/375; 525/420; 525/425; 525/437; 528/347; 528/492; 548/215; 548/239
(58) Field of Classification Search ............. 525/425, 525/437, 375, 420; 528/347, 492; 548/215, 548/239
See application file for complete search history.

(56) References Cited

U.S. PATENT DOCUMENTS

| | | | |
|---|---|---|---|
| 4,217,435 A | 8/1980 | McConnell et al. | |
| 4,806,588 A | 2/1989 | Fujimoto et al. | |
| 5,378,769 A * | 1/1995 | Mugge et al. | 525/425 |
| 5,762,849 A | 6/1998 | Argast et al. | |
| 6,306,967 B1 | 10/2001 | Spyrou et al. | |
| 6,515,044 B1 * | 2/2003 | Idel et al. | 523/351 |
| 6,579,581 B2 | 6/2003 | Bartz et al. | |
| 6,660,796 B2 | 12/2003 | Schueler et al. | |
| 2007/0166560 A1 | 7/2007 | Wursche et al. | |

FOREIGN PATENT DOCUMENTS

| | | |
|---|---|---|
| EP | 0 279 578 A1 | 8/1988 |
| EP | 0 284 379 A2 | 9/1988 |
| EP | 0541926 | 5/1993 |
| WO | WO 89/01962 | 3/1989 |
| WO | WO 00/15693 | 3/2000 |
| WO | WO 2004/101666 A2 | 11/2004 |

OTHER PUBLICATIONS

U.S. Appl. No. 11/816,588, filed Aug. 17, 2007, Haeger, et al.
Hiroo Inata, et al., "Chain Extenders for Polyester. II. Reactivities of Carboxyl-Addition-Type Chain Extenders; Bis Cyclic-Imino-Ethers", Journal of Applied Polymer Science, vol. 32, 5193-5202 (1986).
Regina Jeziorska, "Studies on reactive compatibilisation of polyamide 6/poly(butylene terephthalate) blends by low molecular weight bisoxazoline", Industrial Chemistry Research Institute, Department of Engineering and Specialty Polymers, Rydygiera 8, 01-793 Warsaw, Poland, Received Oct. 25, 2004; revised Mar. 2, 2005; accepted Mar. 17, 2005. Available online Jul. 18, 2005.
Tommi Vainio, et al. "Functionalization of Polypropylene with Oxazoline and Reactive Blending of PP with PBT in a Corotating Twin-Screw Extruder" John Wiley and Sons. Inc. Journal of Applied Polymer Science 63, (pp. 883-894), 1997.

* cited by examiner

*Primary Examiner*—David Wu
*Assistant Examiner*—Robert Jones, Jr.
(74) *Attorney, Agent, or Firm*—Oblon, Spivak, McClelland, Maier & Neustadt, L.L.P.

(57) ABSTRACT

A continuous process for the reactive compatibilization of polymers includes I. processing monooxazoline, bisoxazoline or a mixture thereof together with a first polymer, to give a reactive polymer; and II. adding the reactive polymer to one or more second polymers. In addition, a reactive polymer contains I. a first polymer; and II. at least 5% by weight of chemically unbound monooxazoline, bisoxazoline or a mixture thereof.

14 Claims, No Drawings

CONTINUOUS PROCESS FOR THE PREPARATION OF A REACTIVE POLYMER

BACKGROUND OF THE INVENTION

1. Field of the Invention

The invention relates to a continuous process for the preparation of a reactive polymer which has chemically unbound mono- and/or bisoxazoline. This reactive polymer is in turn useful for the reactive compatibilization of polymers.

2. Discussion of the Background

The reaction of bifunctional oxazolines with polyesters or polyamides is adequately described in the literature. The terminal carboxyl groups of the particular polymer react with the oxazoline with ring opening. A reactive compatibilization polyamide 6 and polybutylene terephthalate is described in *Polymer Degradation and Stability*, Volume 90, 2005, 224-233. One aim of this reactive compatibilization is to combine the high impact strength of the polyamide with the chemical and water resistance of polybutylene terephthalate in one polymer blend. Reactive compatibilization of polyamide and polybutylene terephthalate with addition of 0.2-0.4% by weight of 1,3-phenylenebisoxazoline in a co-rotating double-screw extruder produces polymer blends which have improved impact strength and reduced water absorption—compared with a polymer blend which has been compatibilized without the addition of 1,3-phenylenebisoxazoline.

*Journal of Applied Polymer Science*, 32, (1986) 5193-5202 describes a chain extension of polyesters using oxazolines.

A continuous and exact metering of mono- and/or bisoxazoline via a funnel—as are mounted on standard commercial kneaders and extruders—is extremely difficult since these mono- and/or bisoxazolines adhere to the walls of the funnel and to the walls of the feeds. This adhesion of mono- or bisoxazoline hinders the continuous and exact metering of these compounds to polymers in standard commercial kneaders and extruders to a considerable degree.

SUMMARY OF THE INVENTION

It was therefore an object of the present invention to provide a continuous process for the reactive compatibilization of polymers with addition of mono- and/or bisoxazoline which permits an exact quantitative metering of this mono- and/or bisoxazoline to the polymers.

This and other objects have been achieved by the present invention the first embodiment of which includes a continuous process for the reactive compatibilization of polymers, comprising:

I. processing monooxazoline, bisoxazoline or a mixture thereof together with a first polymer, to give a reactive polymer; and II. adding said reactive polymer to one or more second polymers.

In another embodiment, the present invention relates to a reactive polymer, comprising:

I. a first polymer; and

II. at least 5% by weight of chemically unbound monooxazoline, bisoxazoline or a mixture thereof.

DETAILED DESCRIPTION OF THE INVENTION

Surprisingly, it has been found that mono- and/or bisoxazoline can be metered to a polymer exactly if the mono- and/or bisoxazoline is firstly processed together with a polymer of type I to give a dust-free and homogeneous reactive polymer, which is preferably obtained as granules. After determining the content of chemically unbound mono- and bisoxazoline in the reactive polymer, then exact metering of the mono- and/or bisoxazoline in the form of a reactive polymer to numerous polymers, such as, for example, polyesters, is possible. The process according to the invention thus permits a simple continuous metering of the mono- and/or bisoxazoline to one or more polymers. Besides the exact metering of the mono- and/or bisoxazoline during the reactive compatibilization, this process according to the invention has the advantage that charging and dust formation can be avoided during the reactive compatibilization. This is of particular advantage since the mono- and bisoxazolines are often hazardous materials.

The invention therefore provides a continuous process for the reactive compatibilization of polymers with addition of mono- and/or bisoxazolines, which is characterized in that I. firstly mono- and/or bisoxazoline is processed together with a polymer of type 1 to give a reactive polymer, and II. then this reactive polymer is added to one or more polymers of type 2.

This invention further provides a reactive polymer which has

I. a polymer of type 1, and

II. chemically unbound mono- and/or bisoxazoline, the reactive polymer having at least 5% by weight of chemically unbound mono- and bisoxazoline.

The continuous process according to the invention for the reactive compatibilization of polymers with addition of mono- and/or bisoxazoline is characterized in that I. firstly mono- and/or bisoxazoline is processed together with a polymer of type 1 to give a reactive polymer, and II. then this reactive polymer is added to one or more polymers of type 2.

The preparation of the reactive polymer in process step I of the process according to the invention preferably takes place by combining a polymer of type 1 and a mono- and/or bisoxazoline. This preferably takes place by means of a kneader or extruder. This process step I preferably takes place at a temperature above the melting point of the polymer and preferably below 250° C., more preferably below 200° C., even more preferably below 150° C. Here, the mono- and/or bisoxazoline is preferably added in a weight ratio of from 1:2 to 1:6, preferably in a weight ratio of from 1:3 to 1:5 to the polymer of type 1.

Process step I of the process according to the invention can either be carried out batchwise or continuously.

In the process according to the invention, either monooxazolines according to structure 1

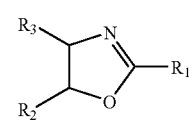

(1)

wherein
$R_1$=alkyl or phenyl group,
$R_2$, $R_3$=independently, hydrogen, or alkyl group,
or bisoxazolines according to structure 2

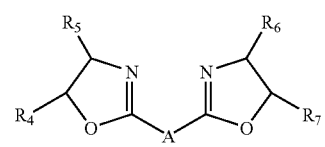

(2)

wherein
$R_4$, $R_5$, $R_6$, $R_7$=independently, hydrogen, or alkyl group,
A=alkylene, or phenylene, wherein the substituents of type $R_1$, $R_2$, $R_3$, $R_4$, $R_5$, $R_6$ and $R_7$ may be identical or different, substituted or unsubstituted and the structure fragment A may be substituted or unsubstituted, are used as mono- and/or bisoxazolines. Preference is given to using mono- and/or bisoxazoline wherein the substituents of type $R_1$, $R_2$, $R_3$, $R_4$, $R_5$, $R_6$ and $R_7$, and also the structure fragment A are unsubstituted.

In process step I of the process according to the invention, preference is given to using bisoxazolines according to structure 2, particularly preferably to using phenylene bisoxazolines, in particular selected from 1,3-phenylenebisoxazoline and/or 1,4-phenylenebisoxazoline.

In one particular embodiment of process step I of the process according to the invention, mixtures of different mono- and bisoxazolines are used.

In process step I, polymers with a melting point preferably of less than 230° C. are used as polymer of type 1. Thus, in process step I of the process according to the invention, it is possible to use polymers of type 1 (first polymer) which have free functional groups, so-called end groups, selected from carboxyl, acid anhydride, phenolic, aminic, epoxide-containing, isocyanate-containing groups. Suitable polymers of type 1 are, in particular, polyamides, polyesters, methacrylates, acrylates or polyolefins.

Preferably, in process step I of the process according to the invention, polymers with carboxyl end groups are used as polymers of type 1. Polymers with a carboxyl end group content of from 10 to 50 mmol/kg (including all subvalues) are preferably used as polymers of type 1, and particular preference is given to using polymers with a carboxyl end group content of from 20 to 40 mmol/kg.

In process step I of the process according to the invention, preference is given to using polymers selected from polyamides, polyesters, polyolefins, methacrylates and acrylates as polymer types with carboxyl end groups. In the process according to the invention, particular preference is given to using polyamides as polymer of type 1, in particular polyamides with a carboxyl end group content of from 10 to 50 mmol/kg (including subvalues), preferably from 20 to 40 mmol/kg.

Polymer mixtures can also be used as polymer of type 1 in the process according to the invention.

The reactive polymer produced according to process step I is preferably in granule form or flaked form. In this way, the metering of the reactive polymer in process step II of the process according to the invention is significantly simplified, in particular no dust formation results in this process step II and precise metering of the "oxazoline to the polymer mixture" can take place. In this way, process step II—the reactive compatibilization—is significantly simplified, meaning that it can be carried out continuously.

In order to be able to ensure precise metering in process step II, in an intermediate process step, the content of chemically unbound mono- and bisoxazoline is determined, this preferably taking place by means of extraction of the chemically unbound mono- and bisoxazoline using a suitable extractant and subsequent gas chromatographic analysis. Thus, the content of chemically unbound 1,3-phenylenebisoxazoline of the reactive polymer can be determined by extracting the 1,3-phenylenebisoxazoline using a suitable extractant, such as, for example, dichloromethane, and then using gas chromatography to quantitatively determine the content of the 1,3-phenylenebisoxazoline. After determining the exact content of chemically unbound 1,3-phenylenebisoxazoline in the reactive polymer, an exact formula for process step II of the process according to the invention—the actual reactive compatibilization can then take place.

In process step II of the process according to the invention, the reactive polymer is added to a polymer of type 2 (second polymer) or to a polymer mixture of polymers of type 2. Thus, in process step II of the process according to the invention, it is possible to use polymers of type 2 which have free functional groups, so-called end groups, selected from carboxyl, acid anhydride, phenolic, aminic, epoxide-containing, isocyanate-containing groups. The reactive polymer produced according to process step I of the process according to the invention preferably serves for the reactive compatibilization of polyamides and polyesters. In particular, a reactive polymer based on polyamides is used for the reactive compatibilization of polyethylene terephthalate.

In one particular embodiment of the process according to the invention, as polymers of the type 2, polyesters, acid-functionalized or acid-anhydride-functionalized polyolefins, acrylonitrile-butadiene-styrene copolymer (ABS) or polyamides containing maleic acid anhydride units can be used for the reactive compatibilization.

As polymer of type 2, it is also possible to use corresponding mixtures of the specified polymers of type 2 in process step II.

The reactive polymer can be produced by means of continuously operating screw machines (extruders or kneaders), which are equipped with single-screw or twin-screw, known to the person skilled in the art. Furthermore, a side feed via so-called side feeders (side delivery via screw) for the mono- and/or bisoxazoline is advantageous.

The reactive polymer according to the invention has
I. a polymer of type 1, and
II. chemically unbound mono- and/or bisoxazoline,
the reactive polymer having at least 5% by weight of chemically unbound mono- and bisoxazoline.

The reactive polymer according to the invention can have either monooxazolines according to structure 1

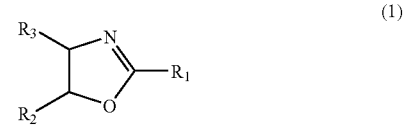

wherein
$R_1$=alkyl or phenyl group,
$R_2$, $R_3$=independently, hydrogen or alkyl group,
or bisoxazolines according to structure 2

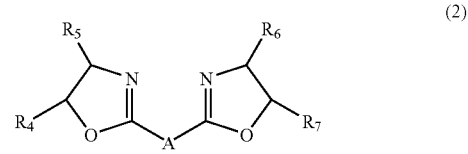

wherein
$R_4$, $R_5$, $R_6$, $R_7$=independently, hydrogen or alkyl group,
A=alkylene or phenylene,
wherein the substituents of type $R_1$, $R_2$, $R_3$, $R_4$, $R_5$, $R_6$ and $R_7$ may be identical or different, substituted or unsubstituted, and the structure fragment A may be substituted or unsubstituted. Preferably, the substituents of type $R_1$, $R_2$, $R_3$, $R_4$, $R_5$, $R_6$ and $R_7$ and also structure fragment A are unsubstituted.

The reactive polymer according to the invention preferably has bisoxazolines according to structure 2, it particularly preferably has phenylenebisoxazolines, in particular selected from 1,3-phenylenebisoxazoline and/or 1,4-phenylenebisoxazoline.

In one particular embodiment of the reactive polymer according to the invention, this polymer has a mixture of different mono- and bisoxazolines.

As polymer of type 1, the reactive polymer according to the invention preferably has polymers with a melting point preferably of less than 230° C. This reactive polymer according to the invention preferably has polymers which have free functional groups, so-called end groups, selected from carboxyl, acid anhydride, phenolic, aminic, epoxide-containing, isocyanate-containing groups. Suitable polymers of type 1 are, in particular, polyamides, polyesters, methacrylates, acrylates or polyolefins.

As polymer types having carboxyl end groups, the reactive polymer according to the invention preferably has polymers selected from polyamides, polyesters, polyolefins, methacrylates and acrylates. The reactive polymer according to the invention particularly preferably has polyamides as polymer of type 1. The reactive polymer according to the invention can also have polymer mixtures as polymer of type 1.

Besides the polymers of type 1, the reactive polymer according to the invention can also have polymers which are a reaction product of the mono- and/or bisoxazoline and the polymer of type 1, the mono- and/or bisoxazoline here being chemically bonded to the polymer of type 1.

The reactive polymer according to the invention therefore preferably has

I. a polymer of type 1,
II. chemically unbound mono- and/or bisoxazoline, and
III. the reaction product of mono- and/or bisoxazoline and polymer of type 1.

The content of chemically unbound mono- and bisoxazoline in the reactive polymer according to the invention is preferably at least 5% by weight, preferably from 8 to 20% by weight, particularly preferably from 10 to 15% by weight, based on the polymer of type 1.

The reactive polymer according to the invention is preferably present in granule form or flaked form.

The reactive polymer according to the invention can be produced according to process step 1 of the process according to the invention.

Having generally described this invention, a further understanding can be obtained by reference to certain specific examples which are provided herein for purposes of illustration only, and are not intended to be limiting unless otherwise specified.

EXAMPLES

Example I 7.67 kg of Ultramid B 40 (polyamide 6) and 1.89 kg of 1,3-phenylenebisoxazoline were metered in a Buss-Ko kneader at a cylinder temperature of 240° C. and a screw speed of 250 rpm via two independent metering devices. In this way, 9.20 kg of reactive polymer were obtained.

Characterization of the Reactive Polymer:

The water content of this reactive polymer was determined in accordance with DIN EN ISO 15512—process B and was 0.04% by weight.

The carboxyl end group content was determined by dissolving 2 g of the reactive polymer in benzyl alcohol and then titrating with methanolic KOH (titre solution: 0.05 mol/l) until the phenolphthalene colour indicator changes colour. The carboxyl end group content of the reactive polymer was <3 mmol/kg.

Determination of the elutable 1,3-phenylenebisoxazoline:

Each 15 g of the reactive polymer were extracted for 18 hours in a Soxhlet extractor in 100 ml of dichloromethane. The extract was concentrated in the nitrogen stream and the residue was dried in vacuo for 18 hours at 95° C. The gas chromatographic content determination produces a content of 1,3-phenylenebisoxazoline of 11.7% by weight, based on the reactive polymer used.

1-H-NMR investigations reveal about 4% by weight of chemically bonded "oxazoline".

German patent application 10 2007 009921.7 filed Feb. 27, 2007, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A continuous process for the reactive compatibilization of polymers, comprising:
   I. processing bisoxazoline together with one or more first polymers, to give a reactive polymer; and
   II. adding said reactive polymer to one or more second polymers;
   wherein said bisoxazoline is added in a weight ratio of from 1:2 to 1:6 to the first polymer; and
   wherein said reactive polymer comprises:
   (i) one or more first polymers;
   (ii) at least 5% by weight of chemically unbound bisoxazoline; and
   (iii) a reaction product of (i) the one or more first polymers and (ii) bisoxazoline.

2. The process according to claim 1, wherein said bisoxazoline has a structure of formula (2)

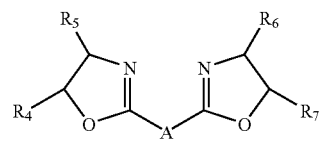

(2)

wherein
   $R_4$, $R_5$, $R_6$, $R_7$=independently, hydrogen or alkyl group;
   A=alkylene, or phenylene; and
   wherein the substituents $R_4$, $R_5$, $R_6$ and $R_7$ are identical or different, substituted or unsubstituted, and the structure fragment A is substituted or unsubstituted.

3. The process according to claim 1, wherein said bisoxazoline is 1,3-phenylenebisoxazoline, 1,4-phenylenebisoxazoline or a mixture thereof.

4. The process according to claim 1, wherein polymers with a carboxyl end group content of from 10 to 50 mmol/kg are used as the first polymer.

5. The process according to claim 1, wherein a content of chemically unbound bisoxazoline is determined after process step I and before process step II.

6. A reactive polymer, comprising:
   I. one or more first polymers;
   II. at least 5% by weight of chemically unbound bisoxazoline; and
   III. a reaction product of (i) bisoxazoline, and (ii) the one or more first polymers.

7. The reactive polymer according to claim 6, comprising bisoxazoline according to the structure of formula (2)

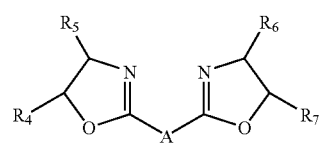

(2)

wherein
   $R_4$, $R_5$, $R_6$, $R_7$=independently, hydrogen or alkyl group;
   A=alkylene, or phenylene; and wherein the substituents $R_4$, $R_5$, $R_6$ and $R_7$ are identical or different, substituted or unsubstituted, and the structure fragment A is substituted or unsubstituted.

8. The reactive polymer according to claim 6, wherein said bisoxazoline is 1,3-phenylenebisoxazoline, 1,4-phenylenebisoxazoline or a mixture thereof.

9. The reactive polymer according to claim 6, wherein a content of chemically unbound bisoxazoline is from 8 to 20% by weight, based on the first polymer.

10. The process according to claim 1, wherein at least one of said first polymers has at least one free functional end group selected from the group consisting of carboxyl, acid anhydride, phenolic, aminic, epoxide-containing, isocyanate-containing groups and combinations thereof.

11. The process according to claim 1, wherein at least one of said first polymers is a polyamide, polyester, methacrylate, acrylate or polyolefin.

12. The process according to claim 1, wherein said second polymer has at least one free functional end group selected from the group consisting of carboxyl, acid anhydride, phenolic, aminic, epoxide-containing, isocyanate-containing groups and combinations thereof.

13. The process according to claim 1, wherein the first and second polymers are different from each other.

14. The process according to claim 1, wherein the second polymer is a polyester.

\* \* \* \* \*